(12) United States Patent
Meynard et al.

(10) Patent No.: US 8,026,484 B2
(45) Date of Patent: Sep. 27, 2011

(54) SPECTRUM-FORMING DEVICE ON AN OPTICAL SENSOR WITH SPATIAL REJECTION

(75) Inventors: Thierry Meynard, Fuveau (FR); Yves Guern, Jouques (FR); François Carpentier, Gignac la Nerthe (FR)

(73) Assignee: SC SPIM, Gignac la Nerthe (FR)

( * ) Notice: Subject to any disclaimer, the term of this patent is extended or adjusted under 35 U.S.C. 154(b) by 289 days.

(21) Appl. No.: 12/293,708

(22) PCT Filed: Feb. 7, 2007

(86) PCT No.: PCT/FR2007/000220
§ 371 (c)(1),
(2), (4) Date: Sep. 19, 2008

(87) PCT Pub. No.: WO2007/107643
PCT Pub. Date: Sep. 27, 2007

(65) Prior Publication Data
US 2009/0251686 A1 Oct. 8, 2009

(30) Foreign Application Priority Data

Mar. 21, 2006 (FR) ...................................... 06 02442

(51) Int. Cl.
*G01J 5/00* (2006.01)
*G01J 3/00* (2006.01)
*G01J 3/28* (2006.01)
(52) U.S. Cl. ......................... 250/338.1; 356/51; 356/328
(58) Field of Classification Search ............... 250/338.1, 250/201.9; 356/51, 328
See application file for complete search history.

(56) References Cited

U.S. PATENT DOCUMENTS

| 5,627,639 | A | 5/1997 | Mende et al. |
| 7,336,353 | B2 * | 2/2008 | Brady et al. ................... 356/310 |

FOREIGN PATENT DOCUMENTS
EP 0 642 005 3/1995

OTHER PUBLICATIONS

International Search Report for PCT/FR2007/000220 filed Feb. 7, 2007.
King M D et al.: "Airborne Scanning Spectrometer for Remote Sensing of Cloud, Aerosol, Water Vapor, and Surface Properties"; Journal of Atmospheric and Oceanic Technology, American Meteortological Society, Boston, MA; vol. 13, No. 4, Aug. 1996; pp. 777-794; XP001240423.

* cited by examiner

*Primary Examiner* — David Porta
*Assistant Examiner* — Faye Boosalis
(74) *Attorney, Agent, or Firm* — Alston & Bird LLP

(57) ABSTRACT

Optical device comprising: a spatial filter means for eliminating, from the light rays emanating from an observed scene those coming from a direction or restricted range of directions in space, while letting through most of the light rays coming from said scene; means for varying the direction or the restricted range of directions in space in correspondence with which the spatial filter means eliminates said light rays; a spectral dispersion means for imparting to the light rays coming from said spatial filter means a deviation that is dependent on their wavelength; and an image detector for recording the light rays dispersed by said spectral dispersion means, each point on said image detector receiving light rays coming from said scene and having a different wavelength depending on the direction in space from which they come.

29 Claims, 1 Drawing Sheet

SPECTRUM-FORMING DEVICE ON AN OPTICAL SENSOR WITH SPATIAL REJECTION

CROSS REFERENCE TO RELATED APPLICATIONS

This application is a national stage application filed under 35 U.S.C. 371 of International Application No. PCT/FR2007/000220, filed Feb. 7, 2007, which claims priority from French patent application 06 02442, filed Mar. 21, 2006.

FIELD AND BACKGROUND OF THE INVENTION

The invention pertains to an optical device making it possible to obtain an image of an observed scene and, at the same time, the optical spectrum at any point of said image.

Such a device allows in particular the discrimination of elements present in a scene, whether gasses, liquids, solid materials or particles.

A first approach, known from the prior art, for obtaining optical image spectra (or spectral images) consists in disposing narrow passband filters in front of a camera, in order to acquire substantially monochromatic images, consisting of light rays having the same wavelength; by performing a plurality of image acquisitions of the same scene using different filters it is possible to reconstitute the optical spectrum of each point of said scene. Such an approach is not satisfactory for several reasons. Firstly, the luminous flux gathered by the camera is generally too weak to make it possible to achieve an acceptable signal-to-noise ratio; an increase in the flux can be obtained only by widening the passband of each filter, that is to say by degrading the spectral resolution. This problem is particularly serious in the case of commercial applications, in which it is desired to use uncooled radiation sensors so as to reduce the cost and complexity of the device. Another drawback is due to the fact that the luminous flux gathered varies greatly from one wavelength to another: consequently the sensitivity and the operating point of the radiation sensors vary from one acquisition to another.

A more promising approach, also known from the prior art, consists in using, in place of the narrow passband filters, band rejection filters, the rejected band also being narrow. A substantially monochromatic image at the wavelength $\lambda_1$ can be obtained by subtracting from a reference image acquired without any filter, an image acquired through a filter eliminating the spectral component at this same wavelength $\lambda_1$. This technique makes it possible to obtain a better signal-to-noise ratio and more contained variations in luminous flux, but it nevertheless exhibits numerous drawbacks related to the use of filters: the wavelengths stopped by the filters cannot be varied in a continuous manner, this leading to a sub-sampling of the spectral space; each filter exhibits, outside the spectral rejection band, a different transmission curve; the use of filters of different thicknesses leads to geometric shifts between the various images; and the movement of the supports of the filters past the sensors tends to modify the operating point of the latter.

For these reasons, the present inventor has developed an optical device using a continuously tunable spectral rejection device not exhibiting the aforesaid drawbacks. This device is described in document FR 2 788 137 and in the article:

Yves Guern, Laurence Grenier and François Carpentier, "Uncooled IRFPA for low-cost multispectral/hyperspectral LWIR imaging device", Spie, Vol. 5093, April 2003, page 126.

This device comprises in particular a first spectral dispersion means (grating, prism), a mask interposed in the path of the dispersed rays so as to intercept a narrow band of wavelengths and a second spectral dispersion means (grating, prism), acting as means for recombining the light rays dispersed by the first means. A continuous scan of the spectrum can be obtained by displacing the mask.

This device constitutes a considerable improvement with respect to the prior art, but it nevertheless exhibits certain drawbacks.

A first drawback is related to the presence of two spectral dispersion means: this gives rise to flux losses and a reduction in the optical passband. Furthermore, diffraction gratings and prisms are expensive devices.

Another drawback consists in the fact that the optics of the device are relatively difficult to design for reasons which will become clearer subsequently.

Another drawback is related to the fact that any modification of the scene or any movement of the apparatus in the course of a series of image acquisitions is liable to generate artifacts in the information acquired, which is compensated at the price of more complex information processing.

SUMMARY OF THE INVENTION

An object of the invention is therefore to attenuate or eliminate at least one of the aforesaid drawbacks.

This object is achieved by an optical device comprising:
  a spatial filtering means for eliminating, from among the light rays arising from an observed scene, those which originate from a direction or a restricted range of directions in space;
  means for varying the direction or the restricted range of directions in space in correspondence with which the spatial filtering means eliminates said light rays;
  a spectral dispersion means for imparting to the light rays arising from said spatial filtering means a deviation dependent on their wavelength; and
  an image detector for recording the light rays dispersed by said spectral dispersion means, each point of said image detector receiving light rays arising from said scene and exhibiting a different wavelength as a function of the direction in space from which they originate.

According to particular embodiments of the invention:
  Said spectral dispersion means can exhibit a dispersion plane, said restricted direction or range of directions in space in correspondence with which the spatial filtering means eliminates said light rays being a direction in said plane.
  The device can comprise a single spectral dispersion means.
  The device can also comprise a data processing means for reconstituting the spectrum of an image of the scene observed on the basis of the signals recorded by said image detector for various choices of the direction or of the restricted range of directions in space in correspondence with which the spatial filtering means eliminates said light rays.
  The device can also comprise a data processing means for reconstituting a wideband image of said scene on the basis of the signals recorded by said image detector. In particular, said data processing means for reconstituting said image can comprise means for calculating the deconvolution of said signals recorded by the image detector with respect to an apparatus function of said device. Preferably said data processing means performs said image reconstruction in real time.

Said spatial filtering means can comprise a first convergent optical system, a second convergent optical system and at least one mask disposed in an image plane of said first convergent optical system.

Said first and second convergent optical systems can form an afocal optical system.

At least said second convergent optical system can be a system with pupil conjugation on the spectral dispersion means.

At least one out of said first and second convergent optical systems can consist of lenses.

Said first convergent optical system can comprise an objective with variable focal length such as a zoom.

Said opaque mask can has a linear shape.

Said spatial filtering means can also comprise at least one, and preferably at least two, screens situated in said image plane so as to delimit a range of directions of the light rays arising from said observed scene and eliminate the rays arising from directions not belonging to said range.

Said means for varying the direction or the restricted range of directions in space in correspondence with which the spatial filtering means eliminates the light rays can comprise an oscillating or rotating mirror for imparting a variable deviation to said light rays before they enter said spatial filtering means; in this case said first convergent optical system can be a system with pupil conjugation on said oscillating or rotating mirror.

Said means for varying the direction or the restricted range of directions in space in correspondence with which the spatial filtering means eliminates the light rays can comprise means of linear displacement of said image detector with respect to said observed scene.

Said means for varying the direction or the restricted range of directions in space in correspondence with which the spatial filtering means eliminates the light rays can comprise means for displacing said mask in the image plane of said afocal system.

Said spectral dispersion means comprises a diffraction grating, which can be concave so as to simplify the optics.

Said grating can exhibit an angle of inclination with respect to an optical axis of said device such that, among the light rays diffracted by said diffraction grating, only those corresponding to a predetermined diffraction order (generally a first order) reach said image detector.

Said image detector can comprise a matrix of luminous radiation sensors, preferably exhibiting an axis perpendicular to said dispersion plane of the spectral dispersion means.

The device can also comprise an objective disposed between said spectral dispersion means and said image detector.

The device can be adapted for operating in any spectral region, such as the ultraviolet, the visible and the infrared, for example in the region of wavelengths lying between 7 and 14 µm.

BRIEF DESCRIPTION OF THE DRAWINGS

Other characteristics, details and advantages of the invention will emerge on reading the description given with reference to the appended drawings given by way of example and which represent, respectively.

DETAILED DESCRIPTION

Figure 1:
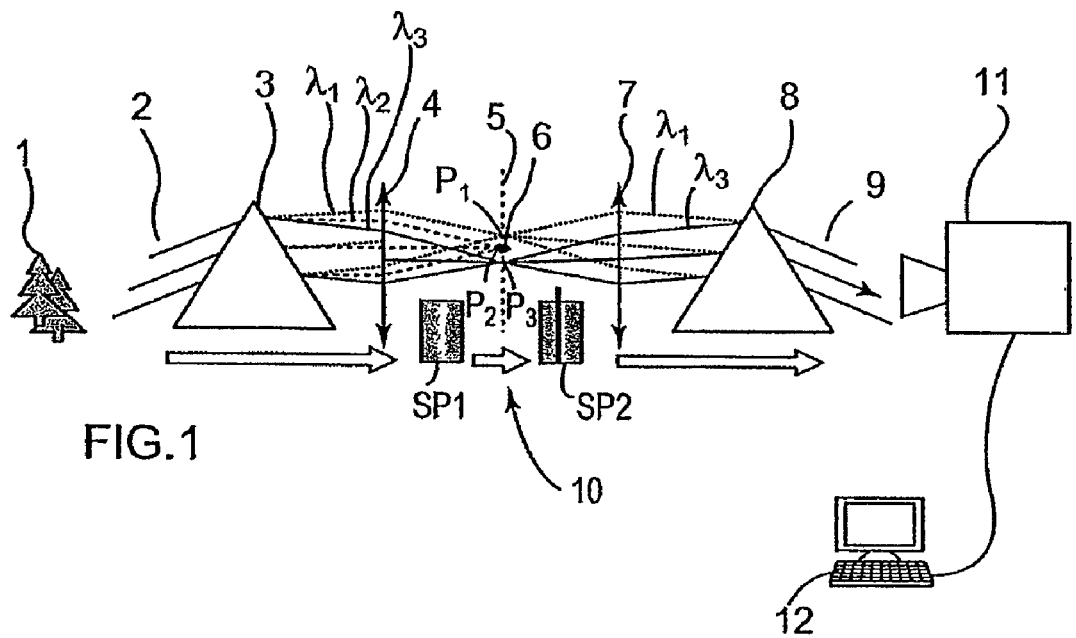
FIG. 1, an optical diagram of a spectral imaging device known to the prior art.

The spectral imaging device known to the prior art represented in FIG. 1 comprises a spectral selection device 10, an infrared camera 11 and a data processing device 12. The spectral selection device 10 consists essentially of a first dispersive prism 3, a first lens or objective 4, an opaque mask 6, a second lens 7 and a second dispersive prism 8. Each objective can have its pupil on the grating which faces it.

A beam 2 of light rays arising from a scene 1 observed by way of the device crosses the first dispersive prism 3 which imparts to each ray a deviation dependent on its wavelength; the figure represents rays of a first wavelength $\lambda_1$ (dotted line), of a second wavelength $\lambda_2$ (dashed line) and of a third wavelength $\lambda_3$ (continuous line). For the sake of simplicity, only mutually parallel rays are represented, but in fact the device receives rays originating from various directions in space as input. The rays dispersed by the prism 3 are focused by the first lens 4; in the latter's focal plane 5, each spectral component ($\lambda_1$, $\lambda_2$, $\lambda_3$) is focused in a distinct point ($P_1$, $P_2$, $P_3$ respectively). An opaque mask 6 is situated in said focal plane 5 so as to intercept all the rays having a determined wavelength, $\lambda_2$ in the case of the figure. The rays which are not intercepted by the mask 6 are collimated by the second lens 7, a focal plane of which coincides with the focal plane 5 of the first lens 4, and are recombined spectrally by the second dispersive prism 8. The beam 9 of light rays exiting the spectral selector 10 is intercepted by the infrared camera 11 which forms an image of the scene 1, from which the spectral component at the wavelength $\lambda_2$ has been removed. A series of acquisitions is performed for various positions of the mask 6 in the focal plane 5, and the data processing device 12 reconstructs the complete spectrum of the image of the scene 1 on the basis of this series of acquisitions.

The spectrum of the beam of light rays at the input 2 is represented symbolically in the figure and identified by the reference SP1. The reference SP2 identifies the spectrum of the output beam 9, exhibiting a dark band (zero brightness) in correspondence with the spectral component $\lambda_2$ intercepted by the mask 6.

FIG. 1 shows the spectral selector 10 in a plane parallel to the dispersion plane of the prisms 3 and 8, for example vertical. It is assumed that the camera 11 is provided with a matrix of detectors exhibiting a vertical axis (columns) and a horizontal axis (rows). In the absence of dispersion introduced by the prisms 3 and 8, the light rays arising from a spatial direction are focused in a point, also indicated by i, of the focal plane 5 and are imaged on a row i of the matrix of detectors of the camera. Because of the dispersion, the rays having a wavelength $\lambda_j$, arising from this same spatial direction i, are not focused at the point i of the focal plane 5, but at another point, dependent on the wavelength, which can be indicated by (i+j), assuming linear dispersion. As the lens 7-prism 8 system exactly compensates the dispersion of the prism 3-lens 4 system, these rays are still imaged on row i of the matrix of detectors, provided that they are not intercepted by the mask 6. If the position of said mask is indicated by k, all the rays whose spatial direction of origin i and wavelength $\lambda_j$ are such that i+j=k will be intercepted. It is therefore readily understood that, assuming the transmission and the spectral sensitivity of the device are constant, the signal sensed by the sensors of row i of the matrix of the camera 11 when the mask 6 is at the position k can be expressed by:

$$S_{ik} = \sum_{j=0}^{N} L_i(\lambda_j) - L_i(\lambda_{k-i}) \quad [1]$$

where $L_i(\lambda_j)$ is the luminance at the wavelength $\lambda_j$ for the direction i, assuming a discrete set of wavelengths $\lambda_j$, j=0–N, a single one of which is eliminated by the mask 6 at each acquisition, and of directions in space i=0–M. Equation [1] shows that each row of the matrix of detectors of the camera 11 records a linear element of an image of the scene 1 of which a spectral component has been removed; the removed spectral component depends on the position of the mask 6 and the row considered. Let $$S_i = \sum_{j=0}^{N} L_i(\lambda_j)$$

be the signal obtained in the absence of any mask; a simple subtraction makes it possible to obtain the luminances for the direction i at the various wavelengths:

$$S_i - S_{ik} = L_i(\lambda_{k-i}) \quad [2]$$

To obtain all the wavelength values of the i-th row, the mask 6 must scan all the positions k. The spectrum originating from the region i is therefore reconstructed gradually on the basis of several images (as many as possible values of k). Consequently, the processing of the raw data by the means 12 can be done only at the end of the series of acquisitions.

The origin of certain drawbacks of this device which were mentioned above can now be understood. Firstly, the lens 7—prism 8 system must exactly compensate the dispersion of the prism 3—lens 4 system; in particular, if the prisms 3 and 7 are equal, the lenses 4 and 7 must have the same focal length. This is a constraint which limits the freedom of the designer of the device. Still another drawback is related to the effects of the movements of the scene or of the device during acquisition. Specifically, these movements have the effect of "mixing" the spectra; stated otherwise, it may happen that the spectral component $\lambda_j$ allocated to the direction i originates in reality from the direction i'≠i. This type of particularly detrimental artifact must be compensated by information processing, based on detecting the moving zones in the image.

A potentially advantageous variant of the device of FIG. 1 comprises diffraction gratings in place of the prisms 3 and 8. However, one encounters the difficulty of eliminating the spurious contributions of order zero (non-dispersive) and of higher orders of diffraction.

Figure 2:
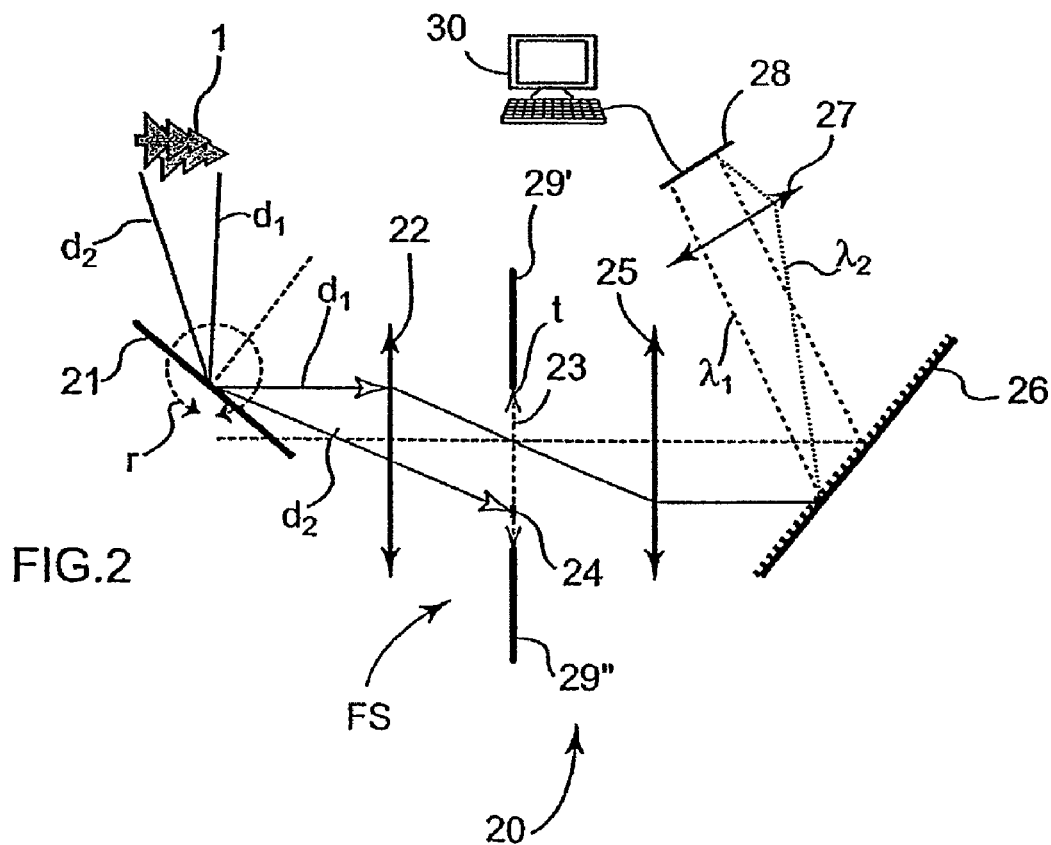
FIG. 2, an optical diagram of a spectral imaging device according to the invention.

A basic diagram of a spectral imaging device 20 according to the invention is represented in FIG. 2, intended to show such a device seen from above. Such a device comprises a mirror 21, optionally oscillating or rotating (double arrow r), a first convergent lens 22 having a focal plane 23, a linear opaque mask 24 disposed in the focal plane 23 and optionally mobile in this plane (double arrow t), a second convergent lens 25, a focal plane of which coincides with the focal plane 23 of the first lens 22, and a spectral dispersion means such as a diffraction grating 26. The grating 26 is observed by an image detector 28 (matrix of radiation sensors) through an objective 27; the objective 27 and the image detector 28 correspond essentially to the camera 11 of the device of FIG. 1. The raw signals acquired by the image detector 28 are processed by a data processing device 30.

Optionally, two screens 29' and 29" disposed in the focal plane 23 delimit a useful region of the latter. If the mask 24 is mobile, the mirror 21 can be fixed or optionally absent. Here and subsequently, the term "lens" should be interpreted in the wide sense as a synonym of refractive optical system that may comprise a plurality of individual lenses.

Light rays arising from an observed scene 1 are incident on the mirror 21, assumed fixed. These rays originate from various directions in space; FIG. 2 shows by way of example a first ray $d_1$ originating from a first direction in space and a second ray $d_2$ originating from a second direction in space. If the scene 1 is situated at infinity, each direction in space is associated with a precise point of said scene.

The rays $d_1$ and $d_2$ are directed by the mirror 21 towards the afocal system formed by the lenses 22 and 25 and the mask 24, identified as a unit by the reference FS. This unit FS constitutes a spatial filtering means: all the rays arising from one and the same direction in space (for example $d_1$ and the rays parallel to $d_1$) are focused in one and the same point of the focal plane 23, also known as the "image plane" of the afocal system. The mask 24 disposed in this plane makes it possible to eliminate all the rays arising from the scene 1 which originate from a determined direction in space, or a restricted range of directions if the finite width of the mask is taken into account; in the case of FIG. 2, this is the direction from which the ray $d_2$ originates. The general principles of spatial filtering are known from the prior art and set out in particular in the work by J. W. Goodman "Introduction to Fourier Optics", McGraw-Hill Book Company. It is understood that it is also possible to provide two or several masks to eliminate the rays originating from a corresponding number of directions. It is however necessary that only a small fraction of the rays arising from the scene 1 is eliminated by the spatial filtering means FS.

It is observed that the device of FIG. 1 comprises a similar arrangement of optical elements (lenses 4 and 7, mask 6) to the spatial filtering means FS of the invention, but whose function is completely different. In the case of FIG. 1 a spectral selector is involved, which eliminates a spectral component of all the rays arising from the scene 1, but does not entirely remove any "spatial component". On the contrary, in the case of the invention, FS is a spatial filtering means within the proper sense of the term, which removes a spatial component of the radiation arising from the scene 1 without distinguishing among its various spectral components.

The rays arising from the spatial filter FS are directed towards the grating 26 which imparts to said rays a deviation dependent on their wavelength. Thus, in FIG. 2, the ray $d_1$ is decomposed into two monochromatic rays having different wavelengths, $\lambda_1$ and $\lambda_2$. By way of the objective 27 these monochromatic rays are imaged at two distinct points of the image detector 28.

In the device of FIG. 2, the grating 26 exhibits a horizontal dispersion plane and the linear mask 24 extends perpendicularly to said dispersion plane (therefore vertically). The person skilled in the art understands that, in such a configuration, the term "direction in space" in fact indicates a direction of the dispersion plane of the grating 26.

Hereinafter it is considered that the detector 28 has a matrix structure and exhibits an axis parallel to the dispersion plane (rows) and an axis perpendicular to the latter (columns). This characteristic is not essential, but facilitates the understanding of the invention and simplifies the numerical processing of the data. For the sake of simplicity, consideration can be limited to a single row of the detector 28: specifically, each of these rows of the detector receives only light rays originating from one and the same horizontal line of the scene 1 and can therefore be processed independently of the others. It is understood that in the limit the detector 28 may comprise just a single row. In this case, the device only allows the acquisition of a unidimensional image; a bidimensional image can be reconstructed on the basis of a plurality of such unidimensional images.

A direction in space from which light rays originate is indicated by i; in the absence of dispersion of the grating 26 and without considering the mask 24, these rays would be focused on the i-th column of the matrix detector 28 (or on the i-th sensor of a horizontal linear detector). Now, the dispersion introduces a wavelength-dependent deviation, which implies that the rays originating from direction i and exhibiting a wavelength $\lambda_j$ are in fact focused on sensor (i+j).

If all the rays entering the device originated from the same direction in space, the detector 28 would simply record a spectrum of these rays, as in a conventional spectrometer. Such a result would be obtained by stationing in the image plane 24 a screen provided with a slot. On the contrary, in the device of the invention, the detector 28 records a superposition of mutually shifted spectra corresponding to the various directions in space. Let $L_i(\lambda_j)$ be the luminance at the wavelength $\lambda_j$ of the rays originating from direction i; when the mask 24 is disposed so as to block the rays arising from direction k, the signal gathered by the i-th sensor (or by the sensors of the i-th column) of the detector 28 is given by:

$$S_{ik} = \sum_{j=0}^{N} L_{i-j}(\lambda_j) - L_k(\lambda_{i-k}) \quad [3]$$

where N is the total spectral width of the device and where, for simplicity, it has been considered that the transmission of the device and the sensitivity of the detector 28 are independent of wavelength. More realistically it may be considered that the mask 24, having a finite width, intercepts all the rays originating from a restricted range of directions in space [k−n/2; k+n/2]; the expression "restricted range" is understood to mean a range of directions which is not wider than a tenth of the visual field of the device, and preferably of the order of a hundredth or less. Equation [3] therefore becomes:

$$S_{ik} = \sum_{j=0}^{N} L_{i-j}(\lambda_j) - \sum_{j=k-n/2}^{k+n/2} L_j(\lambda_{i-j}) \quad [4]$$

The signal in the absence of the mask is indicated by $S_i$, without the index k:

$$S_i = \sum_{j=0}^{N} L_{i-j}(\lambda_j) \quad [5]$$

Performing the subtraction $S_i - S_{ik}$, we obtain:

$$S_i - S_{ik} = \sum_{j=k-n/2}^{k+n/2} L_j(\lambda_{i-j}) \quad [6]$$

The meaning of equation [6] is more clearly apparent if one considers a mask that eliminates only the direction k in space. In this case:

$$S_i - S_{ik} = L_k(\lambda_{i-k}) \quad [7]$$

The signal obtained after subtraction is nothing other than the spectrum of the rays arising from direction k. By displacing the mask 24 with the aid of an actuation means (not represented), such as a galvanometer, a scan of k is performed over an admissible range of directions in space, which enables the reconstitution of the spectrum of the complete image of the scene 1.

It is desirable to be able to acquire, in the course of the scan of the mask 24, a real-time wideband image of the observed scene 1. The expression wideband image is understood to mean an image consisting of a plurality of spectral components which can be distinguished by the spectral imaging device; in an equivalent manner, a wideband image is an image whose spectrum exhibits a bandwidth which is greater than the spectral resolution of the device. Such an image acquisition makes it possible to verify that the device always observes the same scene and, if appropriate, to correct small displacements of the visual field. The data processing means 30 performs a real-time deconvolution of the signal acquired by the detector 28 and the apparatus function of the device, transmission of the device (which can be measured), comprising in particular its optical transmission function, then reconstructs the image of the scene 1. In a conventional manner, the deconvolution can be calculated with the aid of Fourier transforms, using wavelets or matrix calculation. This method therefore exploits the fact that the flux originates each time from (almost) all of the scene, which would not be possible with a conventional slot spectrometer.

It is known that deconvolution is a potentially unstable operation which is very sensitive to the initial conditions. For this reason it is advantageous to provide, in the image plane 23 of the spatial filtering means FS, two fixed screens 29', 29" so as to delimit a range of directions of the light rays arising from said scene observed and to eliminate the rays arising from directions not belonging to said range. The mask 24 is situated or moves in the gap between the two screens. In this way it is known a priori that the signal is zero on the edges of the range delimited by the screens 29', 29" and in correspondence with the mask 24, thereby limiting the risks of instability when reconstituting the spectral images. As a variant, a single fixed screen can be used.

Equation [7] shows that the finer the mask 24, the better the spatial resolution of the device 20, but more acquisitions are necessary to obtain a spectrum of the entire image. Furthermore, the use of too fine a mask gives rise to a degradation of the signal-to-noise ratio of the reconstituted image. In practice, n is chosen between 1 and 10 pixels (individual sensors of the matrix detector 28), thereby corresponding to a physical mask width given by $n.PixelSize.f_{27}/f_{25}$, where PixelSize is the size of each pixel of the detector 28 and $f_{27}$, $f_{25}$ are the focal lengths of the objective 27 and of the lens 25, respectively. The spectral resolution, on the other hand, is independent of the width of the mask and depends exclusively on the dispersion of the grating 26 and the spatial resolution of the objective 27-detector 28 unit.

Numerous variants of the device of FIG. 2 can be envisaged. Firstly, the mask 24 can be kept fixed, scanning possibly being obtained by rotating or oscillating the entrance mirror 21. In this case it is advantageous that the entrance pupil of the device be situated on said mirror 21, so as to prevent the rotation or oscillation of this mirror from giving rise to a lateral displacement of the images of close objects. Alternatively, the movements of the mirror and of the mask can be combined.

As was stated earlier, the "lenses" 22 and 25 can in fact be complex optical systems, consisting of several individual lenses. In particular, it is very advantageous that at least the second lens 25 effects the pupil conjugation of the grating, so as to limit the problems of vignetting and of non-uniformity of the reflectivity of the grating as a function of field angle. When the entrance mirror 21 is an oscillating or rotating one, it is advantageous that the first lens 22 has pupil conjugation too.

Said lenses 22 and 25 can also be replaced with systems comprising mirrors, for example concave mirrors. More generally, the spatial filter FS can be replaced with other spatial filtering means having a different physical structure. The spatial filter is rendered "tunable" by means making it possible to vary the direction or the restricted range of directions in space in correspondence with which the light rays are eliminated. The means for displacing the mask 24 and the oscillating or rotating mirror 21 merely constitute examples of such means. Alternatively, the same effect can be obtained by performing a linear displacement of the image detector 28 with respect to the observed scene, for example by mounting a device according to the invention on a moving vehicle, such as an airplane. In this way, the spectral imaging device need not comprise any moving part. The linear displacement of the detector 28 can also be combined with the use of a mobile mask and/or of an oscillating or rotating mirror.

The grating 26 can be replaced with another spectral dispersion means, such as a prism.

The grating can also be concave: it then also ensures all or part of the imaging functions thus eliminating the lens 25 and/or the objective 27.

In all these cases, the optimal choice from among the various possibilities offered depends on the specific application considered, and in particular on the spectral domain for which the device is designed.

The device 20 of FIG. 2 exhibits significant advantages with respect to the device of the prior art represented in FIG. 1. Firstly, the presence of a single spectral dispersion means makes it possible to substantially increase the transmission factor and the passband of the device and at the same time to reduce the cost thereof. Furthermore, the designer has greater freedom of choice when dimensioning the optical lenses or systems 22, 25: specifically, it is not necessary for said lenses to have the same focal length, or for them to form an afocal system. It is thus possible to replace the lens 22 with an objective with variable focal length such as a zoom, preferably motorized, which would not have been conceivable in the case of the device of FIG. 1, since any modification of the focal length of the lens 4 would have prevented the spectral recombination of the dispersed rays.

Another advantage consists in the elimination of spectral artifacts due to the movements of the scene 1 or of the device in the course of the series of acquisitions. Specifically, since the complete spectrum of a part of the scene is obtained at each acquisition of an image of the matrix, the temporal variations of the scene which produce artifacts in the case of the device of FIG. 1 are of markedly lesser consequence.

Yet another advantage is that the processing of the raw data making it possible to obtain the spectral images, as well as the wideband image, can be done in real time, that is to say as these data are acquired, without having to wait for the end of the scan.

Yet another advantage is that it is possible to perform a reduced scan so as to obtain complete spectra of just a part of the scene 1. In the case of the device of FIG. 1, a partial scan on the contrary provides partial spectra of the entire image.

Yet another advantage consists in the fact that it is relatively simple to remove the spurious images due to the higher diffraction orders of the grating 26, simply by suitably choosing the inclination of said grating with respect to the optical axis of the device. On the contrary, this is not possible in the case of a spectral selector of the type of FIG. 1, in which the prisms would be replaced with two gratings. In such a device, spurious images are due, for example, to rays which undergo specular reflection (order 0) on the first grating and a $2^{nd}$-order diffraction on the second grating. These rays pass through the plane of the mask substantially in the same place as the "useful" rays, undergoing two $1^{st}$-order diffractions, and consequently they cannot be eliminated by screens or apertures.

On the other hand, the use of a mask 24 having a finite width introduces blur into the image, but this undesirable effect can easily be compensated by performing a deconvolution with a rectangular "gate" signal.

The invention claimed is:

1. An optical device comprising:
a spatial filtering means for eliminating, from among the light rays arising from an observed scene, those which originate from a direction or a restricted range of directions in space, while allowing through the largest part of the light rays arising from said scene;
means for varying the direction or the restricted range of directions in space in correspondence with which the spatial filtering means eliminates said light rays;
a spectral dispersion means for imparting to the light rays arising from said spatial filtering means a deviation dependent on their wavelength; and
an image detector for recording the light rays dispersed by said spectral dispersion means, each point of said image detector receiving light rays arising from said scene and exhibiting a different wavelength as a function of the direction in space from which they originate,
wherein said spatial filtering means is adapted for eliminating, from among the light rays arising from an observed scene, those which originate from a restricted range of directions in space, not exceeding a tenth of the width of the visual field of the device.

2. The device as claimed in claim 1 in which said spatial filtering means is adapted for eliminating, from among the light rays arising from an observed scene, those which originate from a restricted range of directions in space, not exceeding a hundredth of the width of the visual field of the device.

3. The device as claimed in claim 1 in which said spectral dispersion means exhibits a dispersion plane and in which said restricted direction or range of directions in space in correspondence with which the spatial filtering means eliminates said light rays is a single direction in said plane.

4. The device as claimed in claim 1, comprising a single spectral dispersion means.

5. The device as claimed in claim 1, further comprising a data processing means for reconstituting the spectrum of an image of the scene observed on the basis of the signals recorded by said image detector for various choices of the direction or the restricted range of directions in space in correspondence with which the spatial filtering means eliminates said light rays.

6. The device as claimed in claim 5, in which said data processing means is adapted for:
calculating a difference between a first signal, recorded by said image detector in the absence of spatial filtering, and a second signal, recorded by said image detector while said spatial filtering means eliminates the light rays which originate from a direction or a restricted range of directions in space; and repeating said calculation for a plurality of directions or of restricted ranges of directions in space so as to reconstitute a spectrum of an image of the observed scene.

7. The device as claimed in claim 1, further comprising a data processing means for reconstituting a wideband image of said scene on the basis of the signals recorded by said image detector.

8. The device as claimed in claim 7 in which said data processing means for reconstituting said image comprises means for calculating the deconvolution of said signals recorded by the image detector with respect to an apparatus function of said device.

9. The device as claimed in claim 7 in which said data processing means performs said image reconstruction in real time.

10. The device as claimed in claim 1, in which said spatial filtering means comprises a first convergent optical system, a second convergent optical system and at least one mask disposed in an image plane of said first convergent optical system.

11. The device as claimed in claim 10 in which said first and second convergent optical systems form an afocal optical system.

12. The device as claimed in claim 10 in which at least said second convergent optical system is a system with pupil conjugation on said spectral dispersion means.

13. The device as claimed in claim 10 in which at least one out of said first and second convergent optical systems consists of lenses.

14. The device as claimed in claim 13 in which said first convergent optical system comprises an objective with variable focal length.

15. The device as claimed in claim 10 in which said opaque mask has a linear shape.

16. The device as claimed in claim 10 in which said spatial filtering means also comprises at least one, and preferably at least two, screens situated in said image plane so as to delimit a range of directions of the light rays arising from said observed scene and eliminate the rays arising from directions not belonging to said range.

17. The device as claimed in claim 10 in which said means for varying the direction or the restricted range of directions in space, in correspondence with which the spatial filtering means eliminates the light rays, comprise means of linear displacement of said image detector with respect to said observed scene.

18. The device as claimed in claim 11 in which said means for varying the direction or the restricted range of directions in space, in correspondence with which the spatial filtering means eliminates the light rays, comprise means for displacing said mask in the image plane of said afocal system.

19. The device as claimed in claim 1 in which said means for varying the direction or the restricted range of directions in space in correspondence with which the spatial filtering means eliminates the light rays comprise an oscillating or rotating mirror for imparting a variable deviation to said light rays before they enter said spatial filtering means.

20. The device as claimed in claim 19 in which said first convergent optical system is a system with pupil conjugation on said oscillating or rotating mirror.

21. The device as claimed in claim 1 in which said spectral dispersion means comprises a diffraction grating.

22. The device as claimed in claim 21 in which said diffraction grating is a concave grating.

23. The device as claimed in claim 21 in which said grating exhibits an angle of inclination with respect to an optical axis of said device such that, among the light rays diffracted by said diffraction grating, only those corresponding to a predetermined diffraction order reach said image detector.

24. The device as claimed in claim 23 in which said predetermined diffraction order is a first order.

25. The device as claimed in claim 1 in which said image detector comprises a matrix of luminous radiation sensors.

26. The device as claimed in claim 25, wherein said spatial filtering means is adapted for eliminating, from among the light rays arising from an observed scene, those which originate from a restricted range of directions in space, not exceeding a tenth of the width of the visual field of the device, and in which said matrix of sensors exhibits an axis perpendicular to said dispersion plane of the spectral dispersion means.

27. The device as claimed in claim 1, further comprising an objective disposed between said spectral dispersion means and said image detector.

28. The device as claimed in claim 1, adapted for operating in the spectral region of the infrared.

29. The device as claimed in claim 28, adapted for operating in the spectral region of wavelengths lying between 7 and 14 µm.

* * * * *